(12) United States Patent
Johnson

(10) Patent No.: US 6,378,819 B1
(45) Date of Patent: Apr. 30, 2002

(54) IMPLEMENT MOUNTING ASSEMBLY FOR ATTACHMENT TO A VEHICLE

(76) Inventor: William W. Johnson, 99 Dunbar Rd., Natchez, MS (US) 39120

( * ) Notice: Subject to any disclaimer, the term of this patent is extended or adjusted under 35 U.S.C. 154(b) by 0 days.

(21) Appl. No.: 09/643,102

(22) Filed: Aug. 21, 2000

(51) Int. Cl.⁷ .............................................. A47B 96/06
(52) U.S. Cl. ...................... 248/214; 248/534; 248/519; 248/539; 248/536; 24/525; 403/232.1; 403/233; 52/736.2
(58) Field of Search ................................ 248/519, 534, 248/214, 223.41, 230.1, 126, 227.4, 205.3, 219.4, 215, 536, 539, 218.4, 207, 219.3, 524; 24/525, 522; 403/232.1, 233, 235, 230, 169; 52/736.2, 737.2; 280/292, 293

(56) References Cited

U.S. PATENT DOCUMENTS

| | | | |
|---|---|---|---|
| 2,330,870 A | 10/1943 | Collier | |
| 2,358,120 A | 9/1944 | Winsick | |
| 2,491,008 A | * 12/1949 | Lake | 248/42 |
| 2,734,708 A | * 2/1956 | Cohn | 248/43 |
| 2,777,625 A | 1/1957 | Kronhaus et al. | |
| 3,658,201 A | 4/1972 | Williams et al. | |
| 3,977,713 A | 8/1976 | Guin | |
| 4,657,249 A | * 4/1987 | Offutt | 273/1.5 R |
| 4,689,889 A | * 9/1987 | Reeves | 33/408 |
| 4,913,393 A | * 4/1990 | Wood | 248/283 |
| 5,040,763 A | * 8/1991 | Wilson | 248/539 |
| 5,105,574 A | * 4/1992 | Fast | 43/21.2 |
| 5,232,135 A | 8/1993 | Marren | |
| 5,509,636 A | * 4/1996 | Cotugno | 249/91 |
| 5,518,156 A | 5/1996 | Lehman | |
| 5,522,530 A | 6/1996 | Boettcher | |
| 5,586,702 A | 12/1996 | Sadler | |
| 5,904,281 A | 5/1999 | Mooers | |
| 5,954,308 A | * 9/1999 | Lane et al. | 248/539 |

* cited by examiner

Primary Examiner—Kimberly T. Wood
(74) Attorney, Agent, or Firm—David L. Ray

(57) ABSTRACT

An implement mounting assembly for attachment to a horizontal bar of a vehicle including a rigid mounting bracket, the mounting bracket having a U-shaped cross-section, the mounting bracket having a first generally rectangular front face and a second generally rectangular rear face, both of the faces having holes therein for receipt of bolts for connecting the bracket to a weight bar of a vehicle, and a hollow rigid receiver rigidly connected to the bracket, the receiver preferably being generally rectangular in cross-section and being oriented vertically upward when the bracket is connected to the weight bar; the rear face of the bracket preferably having a generally rectangular slot therein for placement over a supporting member which may be connected to the weight bar. Preferably the receiver has a collar located around the outside of the upper end thereof for providing additional strength to the upper end of the receiver.

5 Claims, 2 Drawing Sheets

IMPLEMENT MOUNTING ASSEMBLY FOR ATTACHMENT TO A VEHICLE

BACKGROUND OF THE INVENTION

1. Field of the Invention

The present invention relates to mounting assemblies connected to the exterior of vehicles for carrying various apparatus. In particularly, the present invention is related to mounting assemblies connected to the exterior of compact utility tractors for carrying various apparatus.

2. Description of the Related Art

Various implement carrying assemblies for attachment to the front or rear of motor vehicles are well known in the art. See for example U.S. Pat. Nos. 5,904,281; 5,586,702; 5,522,530; 5,518,156; 5,232,135; 3,977,713; 3,658,201; 2,777,625; 2,358,120; and 2,330,870. Most mounting assemblies of the prior art are utilized on motor vehicle such as trucks, automobiles or off road vehicles commonly referred to as sport utility vehicles.

As known in the art, compact utility tractors are tractors which are not full-size farming tractors but are used as vehicles for carrying spraying equipment for spraying fertilzers and weed killers on large yards and lawns, and they are also used in grass cutting and gardening. Compact utility tractors are also sometime utilized in small farming and gardening operations and may have implements for earth work mounted on the back end or front end thereof.

Most compact utility tractors known in the art come equipped with a front weight rack or bar. The front weight bar is used for receiving weights added to the front end of the tractor as desired to prevent the front tires of the tractor from rising upward from the ground when the tractor is towing a heavy load. When pulling heavy loads, the rear drive wheels of the vehicle may deliver sufficient torque to the surface upon which the drive wheels are contacting to lift the front wheels from the surface if sufficient weight is not added to the front weight bar or rack. Such weight bars generally extend from one side of the front of the tractor to the other side of the front of the tractor. The weight rack or bar is usually made from a flat bar oriented vertically on its horizontal edges and connected to the chassis of the tractor by rigid metal braces or beams.

SUMMARY OF THE INVENTION

In accordance with the present invention there is provided an implement mounting assembly for attachment to a horizontal bar of a vehicle including a rigid mounting bracket the mounting bracket having a U-shaped cross-section, the mounting bracket having a first generally rectangular front face and a second generally rectangular rear face, both of the faces having holes therein for receipt of bolts for connecting the bracket to a weight bar of a vehicle, and a hollow rigid receiver rigidly connected to the bracket, the receiver preferably being generally rectangular in cross-section and being oriented vertically upward when the bracket is connected to the weight bar, the rear face of the bracket preferably having a generally rectangular slot therein for placement over a supporting member which may be connected to the weight bar. Preferably the receiver has a collar located around the outside of the upper end thereof for providing additional strength to the upper end of the receiver.

The implement mounting assembly of the invention has the advantage of being low in cost.

The implement mounting assembly of the invention has the additional advantage of enabling various implements to be quickly connected and removed therefrom.

The implement mounting assembly of the invention has the further advantage of being easily attachable to a vehicle.

DESCRIPTION OF THE PREFERRED EMBODIMENTS

Figure 1:
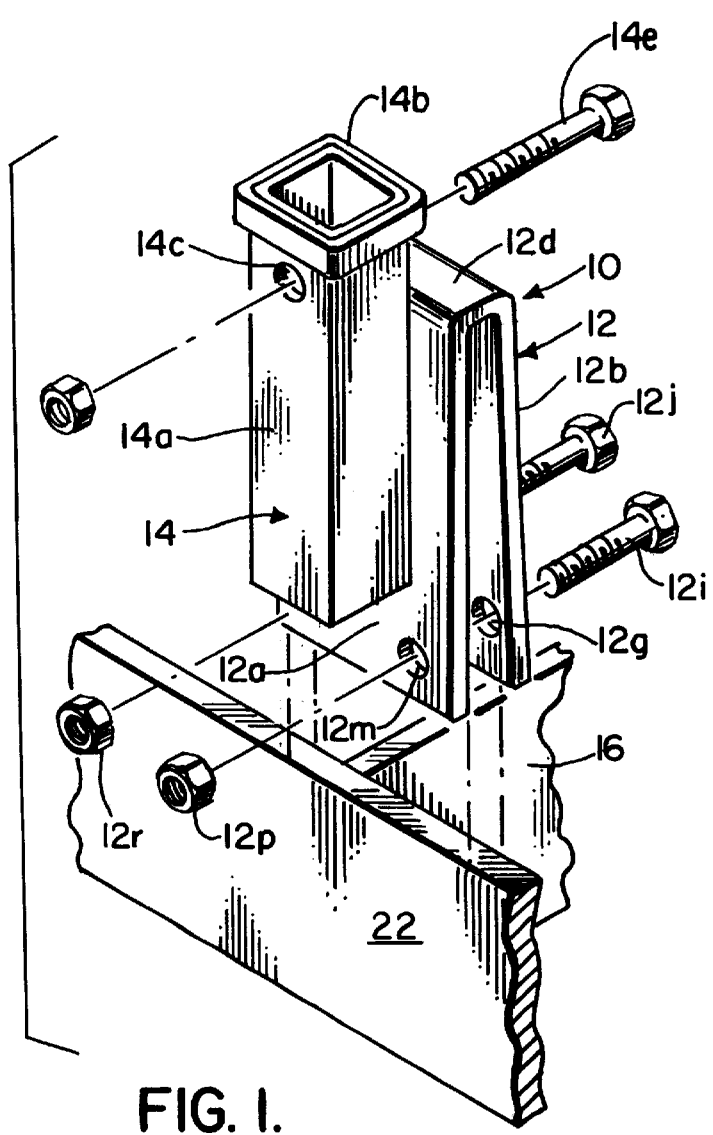
FIG. 1 is a perspective, exploded, partly cut-away view of the implement mounting assembly of the invention aligned for placement on a weight bar of a vehicle such as a compact utility tractor.
Figure 2A:
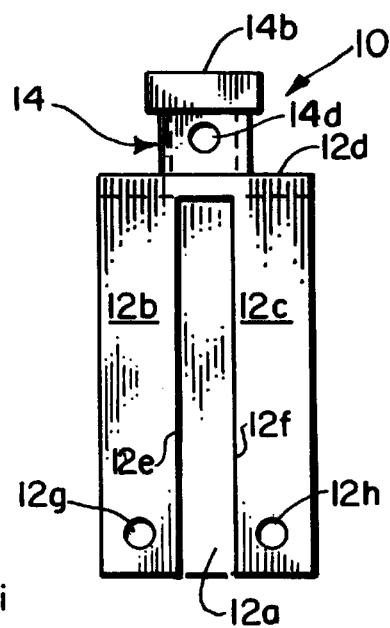
FIG. 2A a rear elevational view of the implement mounting assembly of the invention FIG. 3 a perspective view, partly cut-away, of a vehicle such as a compact utility tractor having the implement mounting assembly of the invention connected to the weight bar thereof and a spreader assembly shown in phantom lines aligned for connection to the implement mounting assembly of the invention.
Figure 2:
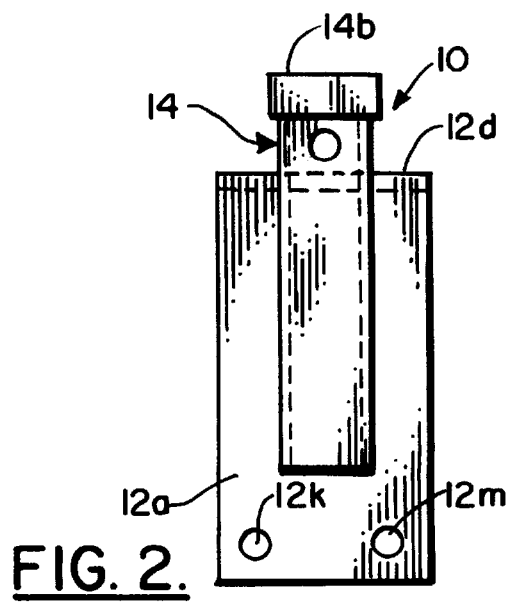
FIG. 2 front elevational view of the implement mounting assembly of the invention.

Referring now to the drawings, the implement mounting assembly of the invention is generally indicated by the numeral 10. Implement mounting assembly 10 can be seen to include a bracket generally indicated by the numeral 12 having a sleeve generally indicated by the numeral 14 rigidly connected thereto.

Bracket 12 is generally U-shaped in cross-section. Bracket 12 has a front face 12a and two rear faces 12b and 12c. Preferably front face 12a is generally rectangular in shape. Preferably, rear faces 12b and 12c are generally rectangular in shape and identical in size.

Front face 12a and rear faces 12b and 12c are connected by top portion 12d. Preferably front face 12a, rear faces 12b and 12c, and bracket top 12d are formed from one, integral, continuous piece of rigid material.

Figures 3, 4:
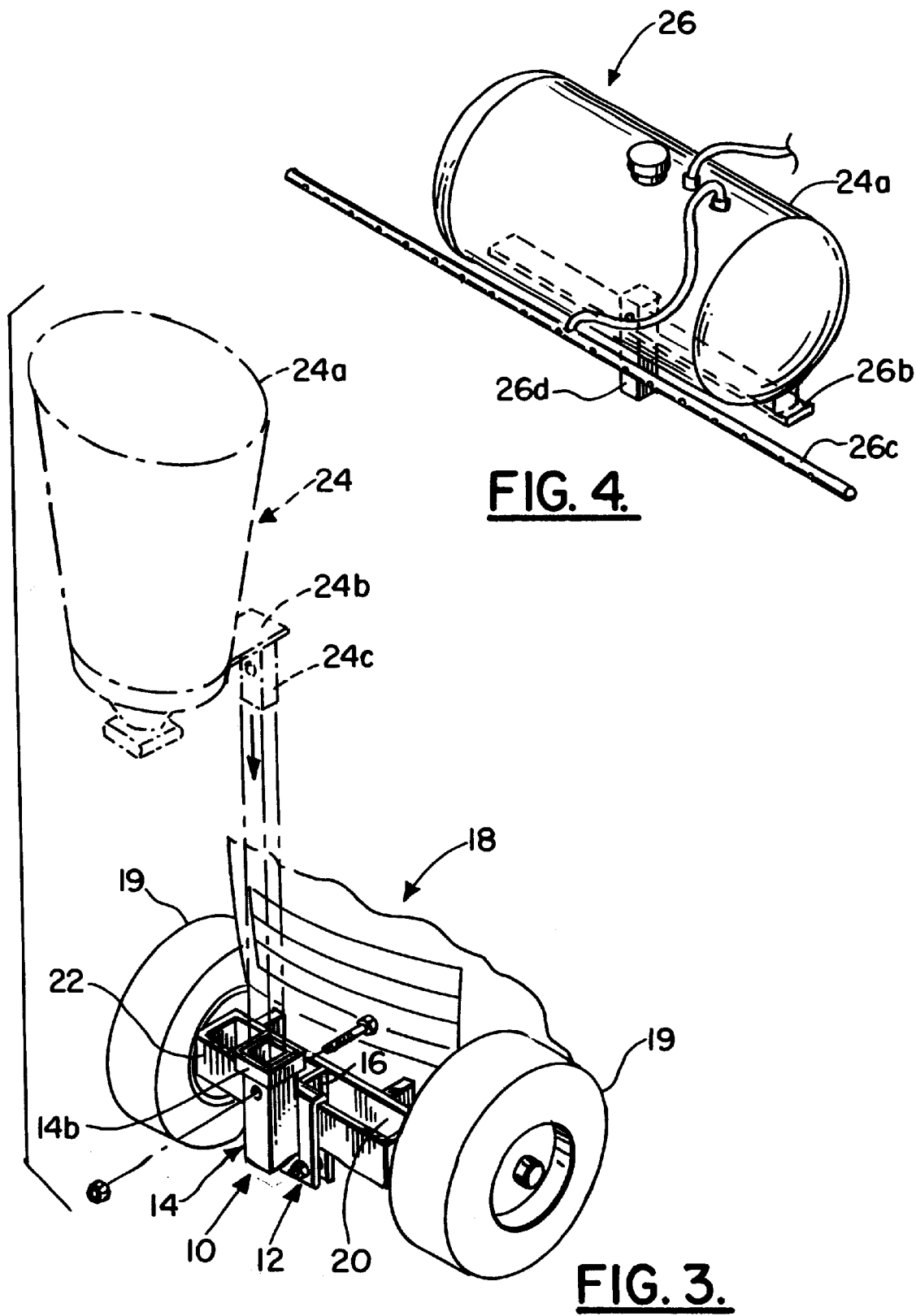
FIG. 4 is a perspective view of a conventional liquid sprayer assembly which can be connected to the implement mounting assembly of the invention.

Rear faces 12b and 12c have two parallel inner-facing straight edges 12e and 12f which are spaced apart a distance sufficient to receive brace 16 therebetween, as shown in FIGS. 1 and 3. Brace 16 extends from the vehicle generally indicated by the numeral 18 having tires 19—19 in FIG. 3. Brace 16 extends forward from the frame or cross-member 20 shown in FIG. 3 and is connected to weight bar or bumper bar 22 of vehicle 18. If desired, the space between rear face 12b and rear face 12c could be eliminated and the rear face could be identical to front face 12 for vehicles which do not have brace 16 located in the center of bar 22.

Rear face 12b and rear face 12c each preferably have a circular hole 12g and 12h aligned therein, respectively, for receipt of a bolt 12i or 12j. Front face 12a has two circular holes 12k and 12m therein aligned with circular holes 12g and 12h for receipt of bolts 12i or 12j.

Sleeve 14 is a hollow, rigid tube 14a. Preferably tube 14a has a generally rectangular, or more preferably, square, cross-section. Preferably sleeve 14 has a collar 14b at the upper end thereof to increase the strength of the sleeve at the upper end. Sleeve 14 is chosen of sufficient size to receive a vertical support post connected to an implement for connecting an implement such as a sprayer assembly or spreader assembly to the implement mounting assembly 10.

A spreader assembly generally indicated by the numeral 24 is shown in FIG. 3. Spreader assembly 24 is illustrative of one of the many implements that may be attached to a vehicle such as a compact utility tractor. Spreader assembly 24 is a conventional broadcast spreader assembly known in the art for spreading fertilizer, seeds, insecticide, or other small granular products over the surface of the ground. Spreader assembly 24 has a product container 24a for holding the products to be spread, a frame 24b for supporting the product container 24a, and a vertical post 24c connected to the frame 24. Vertical post 24c has a square cross-section sized to be snugly received inside sleeve 14 of implement mounting assembly 10.

A sprayer assembly generally indicated by the numeral 26 is shown in FIG. 3. Sprayer assembly 26 is illustrative of another of the many implements that may be attached to a vehicle such as a compact utility tractor utilizing the implement mounting assembly 10 of the invention. Sprayer assembly 26 is a conventional liquid sprayer assembly known in the art for spreading liquid fertilizer, insecticide, or other liquid products over the surface of the ground. Sprayer assembly 26 has a tank 26a for holding the liquid to be sprayed, a frame 26b for supporting tank 26a, a perforated spray tube 26c for spraying liquids from tank 26a, and a vertical post 26d connected to the frame 26. Vertical post 26d has a square cross-section sized to be snugly received inside sleeve 14 of implement mounting assembly 10.

The vehicle 18 shown in FIG. 3 may be a compact utility tractor having a weight rack or bar 22 for receipt of additional weights to prevent the front end of the tractor 18 from lifting from the ground when tractor 18 is pulling heavy loads. The implement mounting assembly of the invention 10 is preferably aligned and placed over weight bar 22 as shown in FIGS. 1 and 3. Rear face 12b and rear face 12c are placed on either side of brace 16. Rear face 12b and 12c and front face 12a are selected of sufficient length to extend from the top of bar 22 downward beneath the bottom of bar 22 to enable bolts 12i and 12j to be placed through holes 12g and 12m and holes 12h and 12k to secure bracket 12 to bar as shown in FIG. 3 by placing nuts 12p and 12r on bolts 12i and 12j, respectively.

To secure an implement to implement receiving assembly 10 after placement of implement receiving assembly 10 on bar 22, the vertical post, such as post 24c or 26d, is placed in sleeve 14. Preferably sleeve 14 has two holes 14c and 14d aligned therein for receipt of bolt 14e. A hole for receipt of bolt 14e is preferably provided in the vertical post, such as 24c or 26d, to enable bolt 14e to be extended through hole 14d, through the holes in the vertical post of the implement, and through hole 14c, thereby enabling nut 14f to be threaded onto bolt 14e to secure the vertical implement post to sleeve 14.

Preferably the implement mounting assembly of the invention is made from a strong, rigid material such as steel, which is preferred, or aluminum. If desired, high strength reinforced polymeric materials may be utilized, although steel is preferred.

While the present invention is particularly suitable for compact utility tractors having a weight rack or bar in the front thereof, the implement mounting assembly of the invention may be used on any vehicle having a horizontal bar to which the assembly of the invention may be attached.

Although the preferred embodiments of the invention have been described in detail above, it should be understood that the invention is in no sense limited thereby, and its scope is to be determined by that of the following claims:

What is claimed is:

1. An implement mounting assembly for attachment to a horizontal bar of a vehicle, said implement mounting assembly comprising:

a. a rigid mounting bracket means for placement over said horizontal bar, said rigid mounting bracket having
      i. a U-shaped cross-section,
      ii. a first generally rectangular front face and a second generally rectangular rear face, both said front and said rear, faces having holes therein for receipt of fasteners for connecting said mounting bracket means to a horizontal bar of a vehicle, and said front face being spaced apart from said rear face, said front face being connected to said rear face by a top portion adapted to rest upon said horizontal bar, said front face and said rear face having at least two of said holes therein aligned together for receipt of said fastener, said rear face of said bracket means having a generally rectangular elongated slot therein, for recieving a crossbar and
   b. a rigid elongated hollow receiver means rigidly connected to said bracket means for receiving and holding an implement to be connected to said vehicle, said receiver means being oriented vertically upward when said bracket means is connected to said horizontal bar, said generally rectangular slot being aligned parallel to a longitudinal axis of said receiver means, said front face of said bracket means being rigidly connected to said receiver means.

2. The implement mounting assembly of claim 1 wherein said front face, said rear face, and said top section are formed from a single, continuous rigid material.

3. The implement mounting assembly of claim 1 wherein said fastener is a bolt.

4. The implement mounting assembly of claim 1 wherein said receiver means has a collar located around the outside of the upper end thereof for providing additional strength to the upper end of said receiver means.

5. The implement mounting assembly of claim 1 wherein said receiver means is generally rectangular in cross-section.

* * * * *